ature Patent Office 3,503,945
Patented Mar. 31, 1970

---

3,503,945
FLUOROETHYLENE COMPOUNDS
Yung Ki Kim, Midland, Mich., assignor to Dow Corning Corporation, Midland, Mich., a corporation of Michigan
No Drawing. Continuation-in-part of application Ser. No. 571,408, Aug. 10, 1966. This application Dec. 2, 1966, Ser. No. 598,604
Int. Cl. C08f 3/62, 3/90, 3/74
U.S. Cl. 260—89.3                    4 Claims

ABSTRACT OF THE DISCLOSURE

Fluorocompounds of the formula $$CH_2=CH(CH_2CH_2)_nR_fX$$

where X is carboxyl, carboalkoxy, amido or cyano group and polymers of these monomers prepared by polymerization of the monomers with free radical catalyst.

An example of a monomer is $$CH_2=CH(CF_2)_6COOC_2H_5$$

and of a polymer

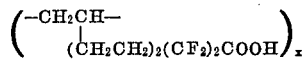

---

CROSS REFERENCE TO RELATED APPLICATIONS

This application is a continuation-in-part of applicant's application, Ser. No. 571,408, filed Aug. 10, 1966, entitled, "Omega-Bromo Perfluoroalkyl Acids," and derivatives thereof, now abandoned.

SUMMARY OF INVENTION

This invention relates to compounds of the formula $CH_2=CH(CH_2CH_2)_nR_fX$ in which $R_f$ is a perfluoroalkylene radical, $n$ is 0, 1 or 2 and X is COOR′, COOH, CONH$_2$ and C≡N and R′ is an alkyl radical from 1 to 6 carbon atoms, and to polymers thereof containing at least one unit of the formula

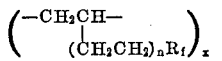

DETAIL DESCRIPTION OF INVENTION

The compositions of this invention are prepared by reacting the omega-bromo-perfluoro esters described and claimed in the aforesaid co-pending application, which is hereby incorporated by reference in this application, with ethylene and thereafter dehydrohalogenating the resulting compound with alkali metal alkoxides. The reaction may be represented as follows:

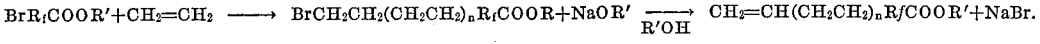

The first step of this reaction involves the addition of ethylene to the omega bromo ester and is carried out in the presence of free radical catalysts such as peroxides. The reaction is conveniently carried at a temperature from 110 to 140° C. under 25–50 p.s.i. pressure. During the reaction, one ethylene group may add to the ester, or 2 or 3 ethylene groups may add to the same ester. That is $n$, in the above formula, can be 0, 1 or 2. The preferred compounds are those in which $n$ is 0.

The ethylene addition product is dehydrohalogenated by reacting with an alkali metal alkoxide in an alcohol solvent. In carrying out the reaction, one should employ the alkoxide of the alcohol corresponding to the R′ group in the ester and the same alcohol should be used as a solvent. Thus, if an ethyl ester is being dehydrohalogenated, one would employ an alkali metal ethyoxide and ethanol as the solvent.

The remaining compounds, in which X is carboxyl, amide or nitrile, are prepared by conventional reactions from the corresponding ester. Thus, for example, the ester $CH_2=CHR_fCOOH_3$ is hydrolyzed by conventional means to the acid, $CH_2=CHR_fCOOH$. The ester is reacted with ammonia under conventional conditions to produce the amide, $CH_2=CHR_fCONH_2$, and the amide can be dehydrated by conventional dehydrating agents such as $P_2O_5$ or phosphorous pentachloride to give $CH_2=CHR_fC\equiv N$.

The unsaturated products of this invention can be polymerized via the C=C to produce polymers of the unit formula

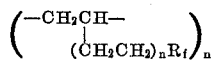

in which $n$, $R_f$ and X are as above defined.

The polymerization of the monomer can be carried out by employing free radical catalysts, for example, peroxides such as di-t-butylperoxide, dicumyl peroxide and

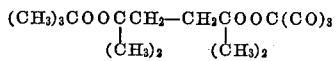

and other tertiary alkyl peroxides; azo compounds such as azo-bisbutyronitrile; organo metallic compounds such as tetraethyl lead and ionizing radiation such as high speed electrons, gamma rays and X-rays. The polymerization is carried out by heating the monomer in the presence of the free radical generator at temperatures from 100–150° C. or above until the desired state of polymerization is obtained.

In addition, the unsaturated monomers of this invention can be copolymerized with other monomers having aliphatic carbon-carbon unsaturation. Examples of such other monomers ard fluorinated olefins such as tetrafluoroethylene, perfluorobutadiene, perfluoropropylene, trifluoropropylene, trifluorochloroethylene; acrylic monomers such as methyl acrylate, methylmethacrylate, acrylic acid and butyl acrylate; vinyl monomers such as vinylchloride, vinylidene fluoride, vinyl acetate and vinylidene chloride; olefins, such as propylene, butadiene, chlorobutadiene, isoprene, styrene, α-methylstyrene, vinyl toluene, and ethylene; unsaturated ethers such as vinylmethylether, the monoallylether of ethyleneglycol and divinylether; esters such as diallylphthalate and allyl acetate; amides such as acryl amide, methacryl amide and nitriles such as acrylonitrile and allyl cyanide.

The above copolymers can be prepared by conventional polymerization techniques and the proportions of the monomers of this invention can vary from .001 to 99.99 mol percent.

For the purpose of this invention, $R_f$ can be any perfluoroalkylene radical such as

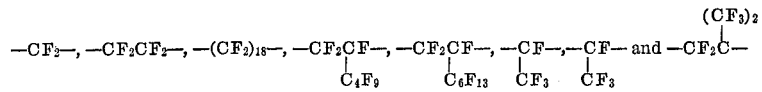

R′ can be any alkyl radical such as methyl, butyl, isopropyl, t-butyl or hexyl.

The monomers of this invention are useful as intermediates in preparation of the polymeric materials and as intermediates in the preparation of organosilicon compounds which are described and claimed in the co-pending application of Yung Ki Kim and Ogden R. Pierce, entitled, "Functional Perfluoroalkylene Organo Silicon Compounds," filed simultaneously herewith. The polymers of this invention are useful as lubricants, as coating agents, and as molding compositions.

The following examples are illustrative only and should not be construed as limiting the invention which is properly delineated in the appended claims.

EXAMPLE 1

A reaction vessel was charged with 200 g. of $$BrCF_2CF_2COOC_2H_5$$

and 7 g. di-t-butyl peroxide. The flask was flushed free of air with ethylene then closed and heated at a temperature of 125–130° C. under about 50 p.s.i. of ethylene pressure. The reaction was stopped at the end of 8 hours. Additional runs were made varying the reaction time from 6 to 18 hours. The crude reaction products obtained were combined and distilled to give the following products.

| Compound | B.P. | Refractive Index |
|---|---|---|
| $BrCH_2CH_2CF_2CF_2COOC_2H_5$ | 79° C. at 4 mm | 1.4005 |
| $Br(CH_2CH_2)_2CF_2CF_2COOC_2H_5$ | 76° C. at 0.5 mm | 1.4145 |

EXAMPLE 2

375 g. of $BrCH_2CH_2CF_2COOH_2H_5$ was added slowly at room temperature to a solution of sodium ethoxide in absolute ethanol. The reaction mixture was stirred an additional two hours at room temperature. The mixture was then stripped in vacuo into a Dry Ice acetone cooled trap until no liquid remained in the flask. Distillation of the material in the trap produced is the compound $CH_2=CHCF_2CF_2COOC_2H_5$, boiling point 142° C. at 740 mm., refractive index at 25° C. 1.3580.

EXAMPLE 3

101 g. of $CH_2=CHCF_2CF_2COOC_2H_5$ and 450 ml. of dry methylenechloride were placed in a vessel equipped with a Dry Ice cooled condenser. Dry ammonia was bubbled into the stirred solution under a mild reflux of ammonia for about 34 hours. The solution was cooled and the compound $CH_2=CHCF_2CF_2CONH_2$ crystallized. It was removed by filtration and had a melting point of 82–83° C.

EXAMPLE 4

A mixture of 73 g. of the amide of Example 3 and 110 g. $P_2O_5$ was heated at about 250° C. The liquid product was distilled, and the compound was $$CH_2=CHCF_2CF_2C\equiv N$$

boiling point 52° C. at 736 mm. of Hg refractive index at 26° C., 1.3080.

EXAMPLE 5

When the compound $Br(CH_2CH_2)_2CF_2CF_2COOC_2H_5$ is dehydrohalogenated in accordance with the procedure of Example 2, the compound $$CH=CH_2CH_2CH_2CF_2CF_2COOC_2H_5$$

is obtained.

When this compound is reacted with ammonia in accordance with the procedue of Example 3, the compound $CH_2=CHCH_2CH_2CF_2CF_2CONH_2$ is obtained. When this amide is dehydrated in accordance with the procedure of Example 4, the nitrile $CH_2=CHCH_2CH_2CF_2CF_2\equiv N$ is obtained.

EXAMPLE 6

When the residue from the experiment of Example 1 is further distilled, the compound $$Br(CH_2CH_2)_3CF_2CF_2COOC_2H_5$$

is obtained. When this compound is dehydrohalogenated in accordance with the procedure of Example 2, and the resulting product is reacted with ammonia in accordance with the procedure of Example 3, and this product is then dehydrated in accordance with the procedure of Example 4, the following products are obtained:

$$CH_2=CH(CH_2CH_2)_2CF_2CF_2COOC_2H_5$$
$$CH_2=CH(CH_2CH_2)_2CF_2CF_2CONH_2$$
$$CH_2=(CH_2CH_2)_2CF_2CF_2C\equiv N$$

EXAMPLE 7

When each of the compounds of Examples 2, 3 and 4 are mixed with ditertiary butylperoxide and heated in the temperature 125 to 150° C., polymers of the following unit structure are obtained.

$$\left(\begin{array}{c}-CH_2CH-\\ |\\ CF_2CF_2COOC_2H_5\end{array}\right)$$

$$\left(\begin{array}{c}-CH_2CH-\\ |\\ CF_2CF_2CONH_2\end{array}\right)$$

$$\left(\begin{array}{c}-CH_2-CH-\\ |\\ CF_2CF_2C\equiv N\end{array}\right)$$

EXAMPLE 8

When the following omega-bromo esters are reacted with ethylene and then dehydrohalogenated in accordance with the procedure of Examples 1 and 2, the following unsaturated esters are obtained.

| Bromo ester | Unsaturated ester |
|---|---|
| $Br(CF_2)_4COOCH_3$ | $CH_2=CH(CF_2)_4COOCH_3$ |
| $Br(CF_2)_6COOC_6H_{13}$ | $CH_2=CH(CF_2)_6COOC_6H_{13}$ |
| $Br(CF_2)_8COOCH(CH_3)_2$ | $CH_2=CH(CF_2)_8COOCH(CH_3)_2$ |
| $BrCFCF_2COOC_2H_5$<br>\|<br>$CF_3$ | $CH_2=CHCFCF_2COOC_2H_5$<br>\|<br>$CF_3$ |
| $Br(CF_2)_{18}COOC_2H_5$ | $CH_2=CH(CF_2)_{18}COOC_2H_5$ |

EXAMPLE 9

When the ester $CH_2=(CF_2)_4COOC_2H_5$ is hydrolyzed with aqueous HCl, the acid $CH_2=CH(CF_2)_4COOH$ is obtained.

When this acid is copolymerized with $$CH_2=CH(CF_2)_2-COOC_2H_5$$

an amount of 50 mol percent of each by heating a mixture of the two with di-t-butylperoxide at 125° C., a copolymer of units of the formulae $$\left(\begin{array}{c}-CH_2CH-\\ |\\ (CF_2)_4COOH\end{array}\right) \text{ and } \left(\begin{array}{c}-CH_2CH-\\ |\\ (CF_2)_2COOC_2H_5\end{array}\right)$$

is obtained.

That which is claimed is:

1. A homopolymer consisting essentially of units of the formula $$\begin{array}{c}-CH_2CH-\\ |\\ (CH_2CH_2)_nR_fX\end{array}$$

in which $n$ has a value of from 0 to 2;

$R_f$ is a perfluoroalkylene radical of from 1 to 18 inclusive carbon atoms; and X is —COOR', —COOH, —CONH$_2$ or —C≡N radical; where R' is an alkyl radical of from 1 to 6 inclusive carbon atoms.

2. The polymer of claim 1 wherein $n$ has a value of 0.

3. The polymer of claim 2 wherein X is a —COOC$_2$H$_5$ radical.

4. The polymer of claim 1 wherein X is a —CONH$_2$ radical.

References Cited

UNITED STATES PATENTS 3,308,106   3/1967   Butler et al _____ 260—85.5

HARRY WONG, JR., Primary Examiner

U.S. Cl. X.R.

204—159.22; 260—80, 80.3, 82, 83.5, 85.5, 85.7, 86.1, 86.3, 87.5, 87.7, 88.1, 88.7, 89.7, 465.9, 486, 539, 561